US010367963B2

(12) United States Patent
Kawai (10) Patent No.: US 10,367,963 B2
(45) Date of Patent: Jul. 30, 2019

(54) INFORMATION PROCESSING SYSTEM AND INFORMATION PROCESSING METHOD CAPABLE OF SETTING CONFIGURATION OF IMAGE FORMING APPARATUS FROM SERVER WITHOUT CHANGING CONFIGURATION SETTING OF FIREWALL

(71) Applicant: KYOCERA DOCUMENT SOLUTIONS INC., Osaka (JP)

(72) Inventor: Takanao Kawai, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 15 days.

(21) Appl. No.: 15/706,246

(22) Filed: Sep. 15, 2017

(65) Prior Publication Data

US 2018/0084133 A1    Mar. 22, 2018

(30) Foreign Application Priority Data

Sep. 21, 2016 (JP) .................................. 2016-183775

(51) Int. Cl.
| | |
|---|---|
| H04L 29/06 | (2006.01) |
| H04N 1/00 | (2006.01) |
| G06F 21/60 | (2013.01) |
| H04L 29/08 | (2006.01) |
| G06F 21/30 | (2013.01) |
| G06F 3/12 | (2006.01) |

(Continued)

(52) U.S. Cl.
CPC ....... *H04N 1/00973* (2013.01); *G06F 3/1222* (2013.01); *G06F 3/1236* (2013.01);
(Continued)

(58) Field of Classification Search
CPC ........... H04N 1/00973; H04N 1/00344; H04N 2201/0094; G06F 21/305; G06F 21/608;
(Continued)

(56) References Cited

U.S. PATENT DOCUMENTS

| | | | |
|---|---|---|---|
| 9,728,107 B1* | 8/2017 | Begen | ....................... G09F 3/00 |
| 2003/0172300 A1* | 9/2003 | Parry | .................... G06Q 20/027 |
| | | | 726/14 |

(Continued)

FOREIGN PATENT DOCUMENTS

| | | |
|---|---|---|
| JP | 2011-237881 A | 11/2011 |
| JP | 2014-102816 A | 6/2014 |

*Primary Examiner* — Ghodrat Jamshidi
(74) *Attorney, Agent, or Firm* — Li & Cai Intellectual Property (USA) Office (57) ABSTRACT

The second connector of the image forming apparatus behind the firewall connects to the first connector of the management server to establish a session. The web browser of the personal computer sends an HTTP request to the first compressor on the basis of an instruction from a user, a destination of the HTTP request being the web server unit of the image forming apparatus. The first compressor of the management server compresses the HTTP request received from the web browser to generate first compressed data, and sends the generated first compressed data to the second decompressor of the image forming apparatus through a communication path established between the first connector and the second connector. The second decompressor of the image forming apparatus decompresses the first compressed data received from the first compressor to reproduce the original HTTP request, and sends the HTTP request to the web server unit.

3 Claims, 6 Drawing Sheets

(52) U.S. Cl.
CPC .......... *G06F 3/1288* (2013.01); *G06F 21/305* (2013.01); *G06F 21/608* (2013.01); *H04L 63/029* (2013.01); *H04L 63/0227* (2013.01); *H04L 63/0281* (2013.01); *H04L 67/02* (2013.01); *H04L 67/141* (2013.01); *H04L 69/04* (2013.01); *H04N 1/00344* (2013.01); *G06F 3/1297* (2013.01); *H04L 67/32* (2013.01); *H04N 2201/0094* (2013.01)

(58) Field of Classification Search
CPC .............. G06F 3/1297; H04L 63/0227; H04L 63/0281; H04L 63/029; H04L 67/02; H04L 67/141; H04L 69/04; H04L 67/32
See application file for complete search history.

(56) References Cited

U.S. PATENT DOCUMENTS

| | | | |
|---|---|---|---|
| 2003/0177204 A1* | 9/2003 | Cherry | H04L 67/34 709/219 |
| 2009/0234972 A1* | 9/2009 | Raghu | H04L 67/2804 709/246 |
| 2010/0131960 A1* | 5/2010 | Suganthi | H04L 63/0272 718/105 |
| 2011/0276960 A1* | 11/2011 | Nakamoto | G06F 8/61 717/178 |
| 2013/0135673 A1* | 5/2013 | Murakawa | G06F 3/1296 358/1.15 |
| 2013/0297814 A1* | 11/2013 | Annamalaisami | H04L 69/08 709/230 |
| 2014/0122576 A1* | 5/2014 | Ohkuma | H04L 67/10 709/203 |
| 2014/0240753 A1* | 8/2014 | Anno | G06F 3/1287 358/1.15 |
| 2015/0109629 A1* | 4/2015 | Takeda | H04L 63/102 358/1.13 |
| 2015/0271292 A1* | 9/2015 | Tachi | H04L 67/32 709/203 |
| 2016/0050340 A1* | 2/2016 | Rubio | H04L 41/5054 358/1.14 |
| 2017/0331789 A1* | 11/2017 | Kumar | H04L 63/0272 |
| 2018/0007215 A1* | 1/2018 | Zakharov | H04N 1/00029 |
| 2018/0059995 A1* | 3/2018 | Hardy | G06F 3/1203 |

* cited by examiner

INFORMATION PROCESSING SYSTEM AND INFORMATION PROCESSING METHOD CAPABLE OF SETTING CONFIGURATION OF IMAGE FORMING APPARATUS FROM SERVER WITHOUT CHANGING CONFIGURATION SETTING OF FIREWALL

CROSS REFERENCE TO RELATED APPLICATION

This application claims the benefit of Japanese Priority Patent Application JP 2016-183775 filed Sep. 21, 2016, the entire contents of which are incorporated herein by reference.

BACKGROUND OF THE INVENTION

1. Field of the Invention

The present disclosure relates to an information processing system and an information processing method executing communication over a firewall.

2. Description of Related Art

In recent years, a server is connected to an image forming apparatus (MFP, Multifunction Peripheral) via a network to extend functions of the image forming apparatus.

SUMMARY OF THE INVENTION

It is desirable to provide an information processing system and an information processing method, with which it is possible to set a configuration of an image forming apparatus at a customer site from an external management server without changing the configuration setting of a firewall.

According to an embodiment of the present disclosure, there is provided an information processing system, including:
a management server at a management site;
a personal computer at the management site, the personal computer being connected to the management server via a network; and
an image forming apparatus at a customer site protected by a firewall, the image forming apparatus being connectable to the management server via the network over the firewall, in which
the management server includes
a first communication device capable of communicating via the network,
a first memory that stores a first relay program, and
a first processor that executes the first relay program,
when the first processor executes the first relay program, the first processor operating as a first connector, a first compressor, and a first decompressor,
the image forming apparatus includes
a second communication device capable of communicating via the network,
a second memory that stores a second relay program, a web server program, and an extension application program, and
a second processor that executes the second relay program, the web server program, and the extension application program,
when the second processor executes the second relay program, the second processor operating as a second connector, a second decompressor, and a second compressor,
when the second processor executes the web server program, the second processor operating as a web server unit,
when the second processor executes the extension application program, the second processor operating as an extension application unit, and
the personal computer includes
a third communication device capable of communicating via the network,
a third memory that stores a web browser program, and
a third processor that executes the web browser program,
when the third processor executes the web browser program, the third processor operating as a web browser, and in which
where no communication path is established between the image forming apparatus and the management server, the second connector of the image forming apparatus behind the firewall connects to the first connector of the management server to establish a session,
the web browser of the personal computer sends an HTTP request to the first compressor on the basis of an instruction from a user, a destination of the HTTP request being the web server unit of the image forming apparatus,
the first compressor of the management server compresses the HTTP request received from the web browser to generate first compressed data, and sends the generated first compressed data to the second decompressor of the image forming apparatus through a communication path established between the first connector and the second connector,
the second decompressor of the image forming apparatus decompresses the first compressed data received from the first compressor to reproduce the original HTTP request, and sends the HTTP request to the web server unit,
the web server unit of the image forming apparatus receives the HTTP request sent from the first compressor, converts the HTTP request into a setting request, and sends the setting request to the extension application unit,
the extension application unit of the image forming apparatus receives the setting request from the web server unit, sets a configuration of the image forming apparatus on the basis of the received setting request, and replies a result of the setting to the web server unit,
the web server unit of the image forming apparatus converts the reply of the result of the setting received from the extension application unit into an HTTP reply, and sends the HTTP reply to the second compressor,
the second compressor of the image forming apparatus compresses the HTTP reply received from the web server unit to generate second compressed data, and sends the generated second compressed data to the first decompressor of the management server,
the first decompressor of the management server decompresses the second compressed data received from the second compressor, reproduces an original HTTP reply, and sends the HTTP reply to the web browser, and
the web browser of the personal computer presents the HTTP reply received from the first decompressor to the user.

According to an embodiment of the present disclosure, there is provided an information processing method of an information processing system including a management server at a management site, a personal computer at the management site, the personal computer being connected to the management server via a network, and an image forming apparatus at a customer site protected by a firewall, the image forming apparatus being connectable to the management server via the network over the firewall, the information processing method including:

where no communication path is established between the image forming apparatus and the management server, by a second connector of the image forming apparatus behind the firewall, connecting a first connector of the management server to establish a session;

by a web browser of the personal computer, sending an HTTP request to a first compressor on the basis of an instruction from a user, a destination of the HTTP request being a web server unit of the image forming apparatus;

by the first compressor of the management server, compressing the HTTP request received from the web browser to generate first compressed data, and sending the generated first compressed data to a second decompressor of the image forming apparatus through a communication path established between the first connector and the second connector;

by the second decompressor of the image forming apparatus, decompressing the first compressed data received from the first compressor to reproduce the original HTTP request, and sending the HTTP request to the web server unit;

by the web server unit of the image forming apparatus, receiving the HTTP request sent from the first compressor, converting the HTTP request into a setting request, and sending the setting request to an extension application unit;

by the extension application unit of the image forming apparatus, receiving the setting request from the web server unit, setting a configuration of the image forming apparatus on the basis of the received setting request, and replying a result of the setting to the web server unit;

by the web server unit of the image forming apparatus, converting the reply of the result of the setting received from the extension application unit into an HTTP reply, and sending the HTTP reply to a second compressor;

by the second compressor of the image forming apparatus, compressing the HTTP reply received from the web server unit to generate second compressed data, and sending the generated second compressed data to a first decompressor of the management server;

by the first decompressor of the management server, decompressing the second compressed data received from the second compressor, reproducing an original HTTP reply, and sending the HTTP reply to the web browser; and by the web browser of the personal computer, presenting the HTTP reply received from the first decompressor to the user.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

Figure 1:
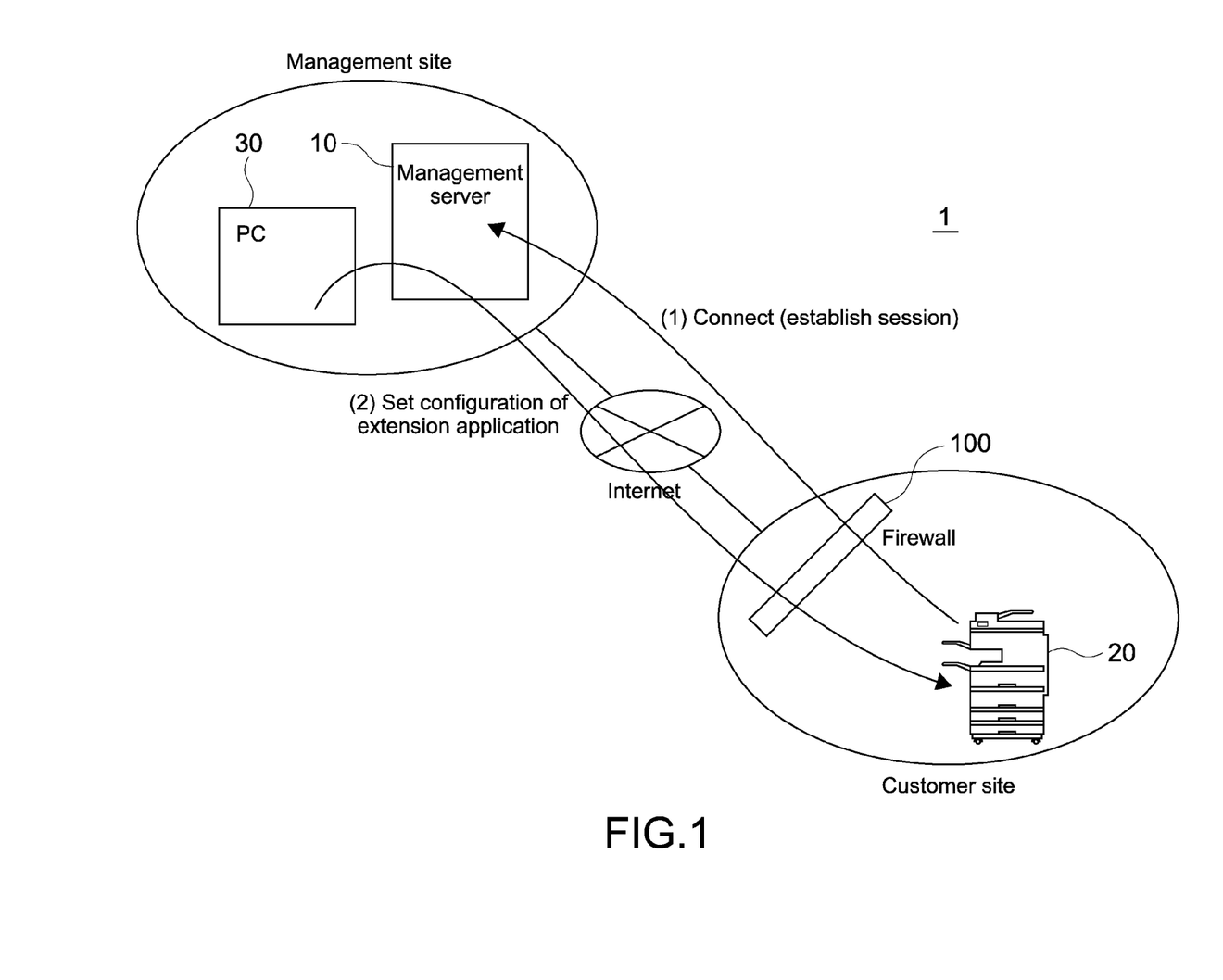
FIG. 1 shows a schematic diagram of an entire configuration of the information processing system 1 according to an embodiment of the present disclosure.

Firstly, an entire configuration of the information processing system 1 according to an embodiment of the present disclosure will be described. FIG. 1 shows a schematic diagram of an entire configuration of the information processing system 1 according to an embodiment of the present disclosure.

The information processing system 1 includes the management server 10 and the PC (Personal Computer) 30 at a management site, and the image forming apparatus 20 at a customer site.

The management server 10 manages the operation status (including various setting, running status, toner remaining amount, paper remaining amount, configuration of extension function, setting configuration of extension application, etc.) of the image forming apparatus 20 at the customer site.

The PC 30 is used to set a configuration of an extension application of the image forming apparatus 20.

The extension application is a program for extending the function of the image forming apparatus 20. The extension application, which is not pre-installed, is installed to be used. In order for the image forming apparatus 20 to execute the extension application appropriately, it is necessary to set a configuration of the image forming apparatus 20. The configuration may be set via an operation device of the image forming apparatus 20 or from the PC 30 remotely.

The image forming apparatus 20 at the customer site communicates over the firewall 100 via the Internet.

In general, the firewall 100 permits communication from the site that the firewall 100 protects. However, the firewall 100 limits connection from the Internet strictly.

Permitted communication over the firewall 100 and refused communication over the firewall 100 are determined on the basis of a security policy of the customer site.

In general, the management server 10 is incapable of setting the configuration of the firewall 100 at the customer site in order to communicate with the image forming apparatus 20 since it requires to change the security policy.

In view of the above, the information processing system 1 does not need to change the setting of the firewall 100.

In the information processing system 1, the PC 30 sets a configuration of the extension application of the image forming apparatus 20 as described in the following procedure.

(1) Firstly, the image forming apparatus 20 at the site behind the firewall 100 connects to the management server 10 to establish a session between the image forming apparatus 20 and the management server 10.

(2) Next, the PC 30 instructs the management server 10 to set the configuration of the extension application of the image forming apparatus 20. The management server 10 sets the configuration of the extension application of the image forming apparatus 20 on the basis of the instruction from the PC 30 through the connection established between the image forming apparatus 20 and the management server 10.

The entire configuration of the information processing system 1 according to an embodiment of the present disclosure has been described above.

Figure 2:
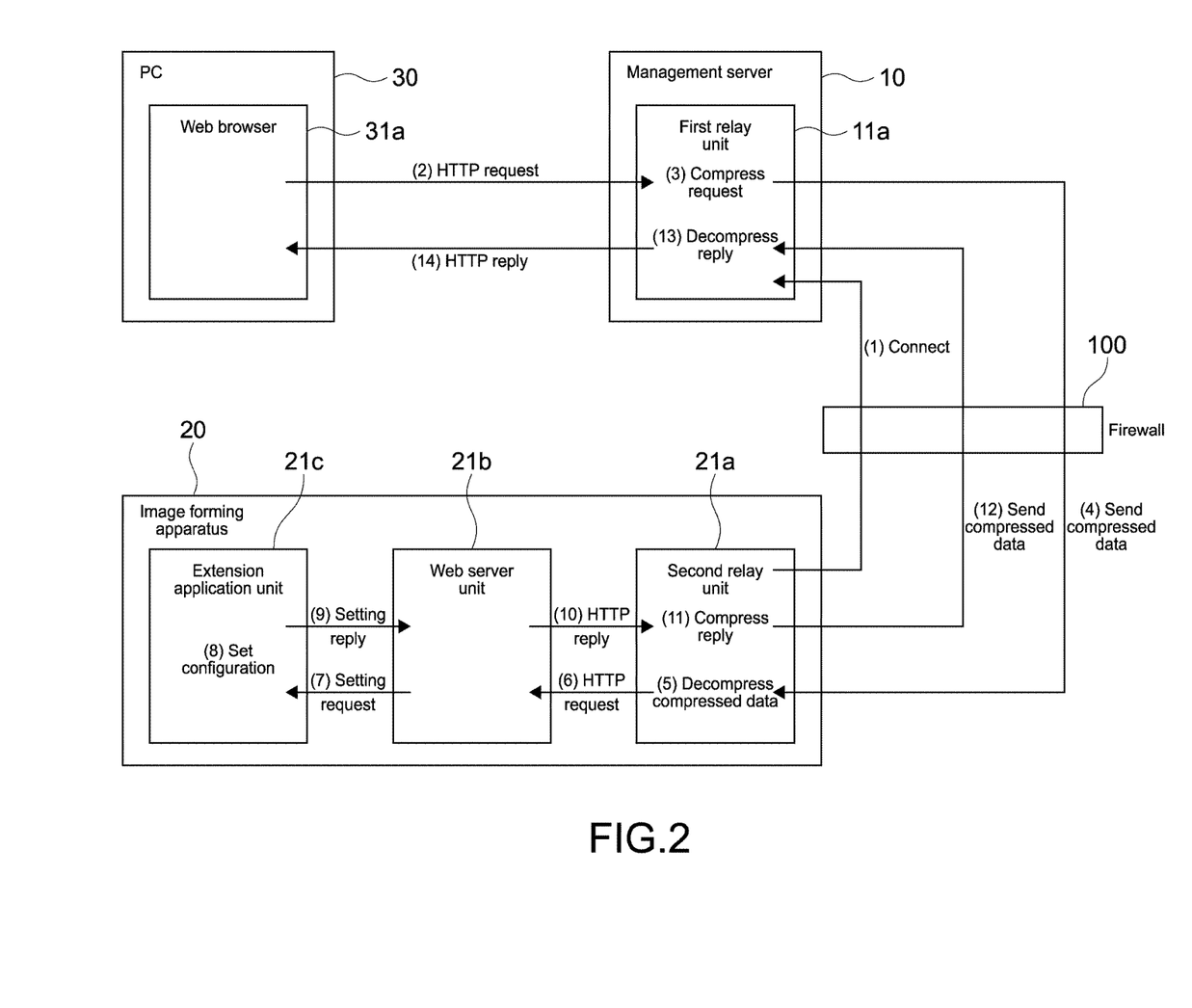
FIG. 2 shows a schematic flow of a process of the information processing system 1.

Next, a more detailed processing flow of the information processing system 1 will be described. FIG. 2 shows a schematic flow of a process of the information processing system 1.

Note that, in the following, the management server 10 includes the first relay unit 11a. The PC 30 includes the web browser 31a. The image forming apparatus 20 includes the second relay unit 21a, the web server unit 21b, and the extension application unit 21c. They exchange information.

(1) Firstly, the second relay unit 21a of the image forming apparatus 20 behind the firewall 100 connects to the first relay unit 11a of the management server 10 to establish a session.

(2) Next, the web browser 31a of the PC 30 sends an HTTP request to the first relay unit 11a, a destination of the HTTP request being the web server unit 21b of the management server the image forming apparatus 20.

(3) Next, the first relay unit 11a compresses the received HTTP request to generate compressed data (first compressed data).

(4) Next, the first relay unit 11a sends the generated compressed data through the communication path established between the first relay unit 11a and the second relay unit 21a.

(5) Next, the second relay unit 21a decompresses the received compressed data to reproduce the original HTTP request.

(6) Next, the second relay unit 21a sends the reproduced HTTP request to the web server unit 21b.

(7) Next, the web server unit 21b sends a setting request to the extension application unit 21c on the basis of the received HTTP request.

(8) Next, the extension application unit 21c sets the configuration of the image forming apparatus 20 on the basis of the received setting request.

(9) Next, the extension application unit 21c returns a reply of a result of the setting configuration to the web server unit 21b.

(10) Next, the web server unit 21b converts the setting reply into an HTTP reply, and sends the HTTP reply to the second relay unit 21a.

(11) Next, the second relay unit 21a compresses the received HTTP reply to generate compressed data (second compressed data).

(12) Next, the second relay unit 21a sends the compressed data to the first relay unit 11a.

(13) Next, the first relay unit 11a decompresses the received compressed data to reproduce an original HTTP reply.

(14) Next, the first relay unit 11a sends the reproduced HTTP reply to the web browser 31a.

A more detailed processing flow of the information processing system 1 has been described above.

Figure 3:
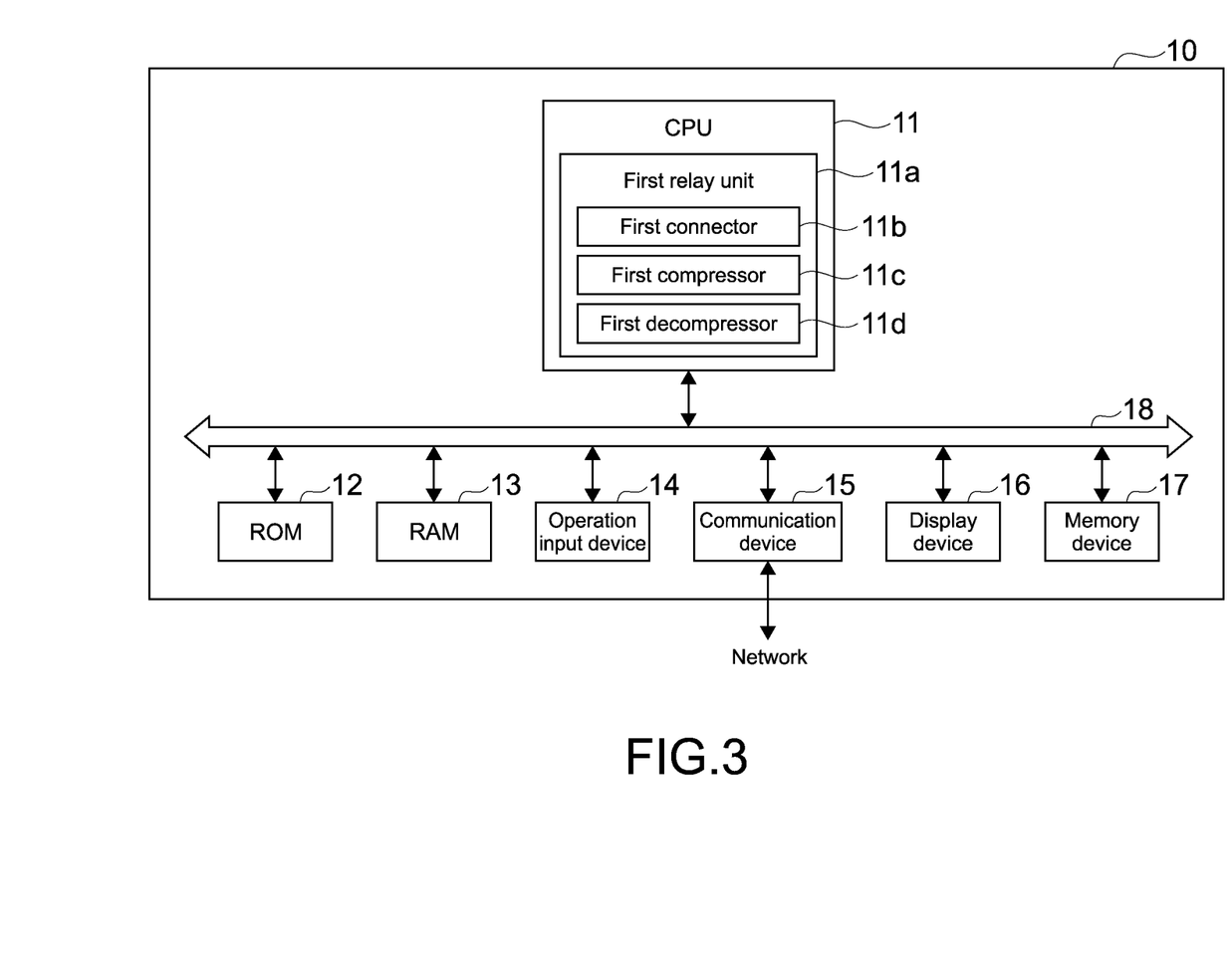
FIG. 3 shows a schematic diagram of a configuration of the management server 10.

Next, a configuration of the management server 10 will be described. The management server 10 may include dedicated hardware and software, or may be a general-purpose computer. FIG. 3 shows a schematic diagram of a configuration of the management server 10.

As shown in FIG. 3, the management server 10 includes the CPU (Central Processing Unit) 11, the ROM (Read Only Memory) 12, the RAM (Random Access Memory) 13, the operation input devices 14, the communication device 15 (first communication device), the display device 16, and the memory device 17, which are connected to each other via the bus 18.

The ROM 12 stores a plurality of programs such as firmware and data used to execute various kinds of process. The RAM 13 is used as a work area for the CPU 11, and temporarily stores the OS (Operating System), various applications being executed, and various data being processed.

The memory device 17 is, for example, an HDD (Hard Disk Drive), a flash memory, or another nonvolatile memory. The memory device 17 stores the OS, various applications, and various data.

The the communication device 15 is connected to the network in order to send and receive information to and from the image forming apparatus 20 and the PC 30.

In response to a command supplied from the operation input devices 14, the CPU 11 (first processor) loads a corresponding program in the RAM 13 out of a plurality of programs stored in the ROM 12 and the memory device 17 (first memory), and executes the loaded program to appropriately control the display device 16 and the memory device 17.

The operation input devices 14 include, for example, a pointing device such as a mouse, a keyboard, a touch panel, and other operation devices.

The display device 16 is, for example, a liquid crystal display, an EL (Electro-Luminescence) display, a plasma display, or the like.

The CPU 11 executes the management server program to thereby realize a functional block, which will be described next.

The CPU 11 of the management server 10 realizes a functional block, i.e., the first relay unit 11a. Note that the first relay unit 11a includes the first connector 11b, the first compressor 11c, and the first decompressor 11d.

Specifically, the management server 10 includes the communication device 15 (first communication device capable of communicating via the network), the ROM 12 or the memory device 17 (first memory) that stores a first relay program, and the CPU 11 (first processor) that executes the first relay program, when the first processor executes the first relay program, the first processor operating as the first connector 11b, the first compressor 11c, and the first decompressor 11d.

Where no communication path is established between the image forming apparatus 20 and the management server 10, the first connector 11b responds to connection from the second relay unit 21a over the firewall 100 to establish a session.

The first compressor 11c compresses an HTTP request received from the web browser 31a of the PC 30 to generate compressed data, and sends the generated compressed data to the second relay unit 21a through the communication path established between the first connector 11b and the second relay unit 21a.

The first decompressor 11d decompresses compressed data received from the second relay unit 21a to reproduce an original HTTP reply, and sends the HTTP reply to the web browser 31a.

The configuration of the management server 10 has been described above.

Figure 4:
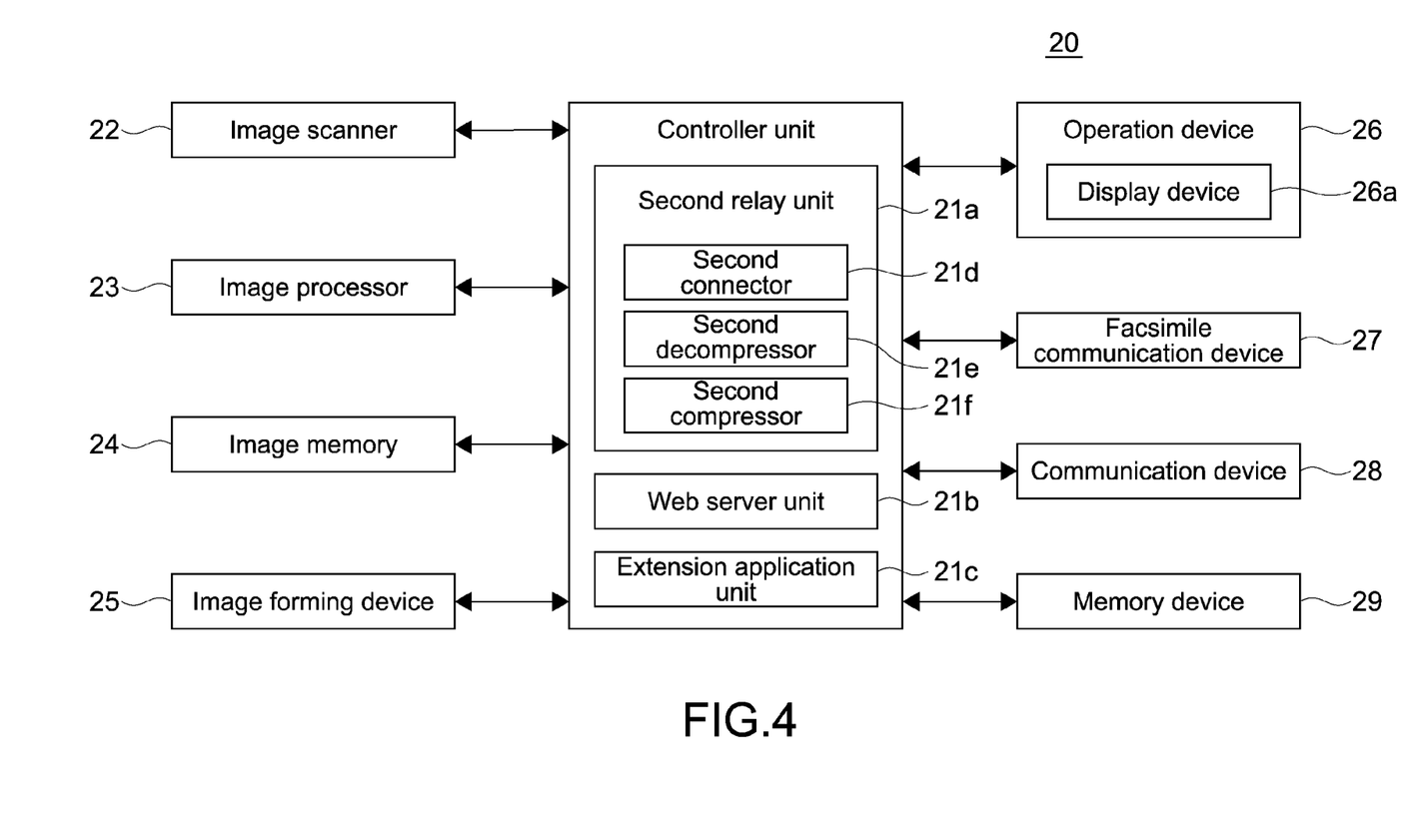
FIG. 4 shows a schematic diagram of a configuration of the image forming apparatus 20.

Next, the configuration of the image forming apparatus 20 will be described. FIG. 4 shows a schematic diagram of a configuration of the image forming apparatus 20.

The image forming apparatus 20 includes the controller unit 21. The controller unit 21 includes a CPU, a RAM, a ROM, a dedicated hardware circuit, and the like, and controls overall operations of the image forming apparatus 20.

The controller unit 21 is connected to the image scanner 22, the image processor 23, the image memory 24, the image forming device 25, the operation devices 26, the display device 26a, the facsimile communication device 27, the communication device 28 (second communication device), the memory device 29, and the like. The controller unit 21 controls the connected devices to operate, and sends and receives signals or data to and from the devices.

In response to job execution instructions input by a user via the operation device 26, a PC connected to the network, or the like, the controller unit 21 controls driving and processing of the mechanisms necessary to execute operational control of the respective functions such as a scanner function, a print function, a copy function, and a facsimile sending and receiving function.

Further, the controller unit 21 includes the second relay unit 21a, the web server unit 21b, and the extension application unit 21c. The CPU (second processor) loads the programs (second relay program, web server program, and extension application program) stored in the ROM (second memory) in the RAM and executes the programs to thereby realize the functional blocks including the second relay unit 21a, the web server unit 21b, and the extension application unit 21c. Note that the second relay unit 21a includes the second connector 21d, the second decompressor 21e, and the second compressor 21f.

Specifically, the image forming apparatus 20 includes the communication device 28 (second communication device capable of communicating via the network), the ROM (second memory) that stores a second relay program, a web server program, and an extension application program, and a second processor that executes the second relay program, the web server program, and the extension application program, when the second processor executes the second relay program, the second processor operating as the second connector 21d, the second decompressor 21e, and the second compressor 21f, when the second processor executes the web server program, the second processor operating as the web server unit 21b, when the second processor executes the extension application program, the second processor operating as the extension application unit 21c.

Where no communication path is established between the image forming apparatus 20 and the management server 10, the second connector 21d behind the firewall 100 connects to the first connector 11b to establish a session.

The second decompressor 21e decompresses compressed data received from the first compressor 11c to reproduce an original HTTP request, and sends the HTTP request to the web server unit 21b.

The second compressor 21f compresses an HTTP reply received from the web server unit 21b to generate compressed data, and sends the generated compressed data to the first decompressor 11d of the management server 10.

The web server unit 21b receives an HTTP request sent from the web browser 31a, converts the HTTP request into a setting request, and sends the setting request to the extension application unit 21c. The web server unit 21b converts a reply of a result of the setting received from the extension application unit 21c into an HTTP reply, and sends the HTTP reply to the second compressor 21f.

The extension application unit 21c receives a setting request from the web server unit 21b, sets a configuration of the image forming apparatus 20 on the basis of the received setting request, and replies a result of the setting to the web server unit 21b.

The image scanner 22 captures an image from a document.

The image processor 23 as necessary processes an image of image data of the image captured by the image scanner 22. For example, the image processor 23 corrects shading of an image captured by the image scanner 22 to improve the quality of the formed image.

The image memory 24 has an area for temporarily storing document image data captured by the image scanner 22, and an area for temporarily storing data to be printed by the image forming device 25.

The image forming device 25 forms an image of image data captured by the image scanner 22, for example.

The operation devices 26 include a touch panel unit and an operation key unit that receive, from a user, instructions of various operations and process that the image forming apparatus 20 can execute. The touch panel unit includes the display device 26a such as an LCD (Liquid Crystal Display) with a touch panel.

The facsimile communication device 27 includes an encoder/decoder, a modulator/demodulator, and an NCU (Network Control Unit) (not shown), and sends facsimile via a public telephone network.

The communication device 28 includes a communication module such as a LAN board. The communication device 28 sends and receives various data to and from apparatuses (PCs, etc.) such as the management server 10 via the LAN and the like connected to the communication device 28.

The memory device 29 stores document images captured by the image scanner 22 and other data. The memory device 29 is a large volume memory device such as an HDD.

The configuration of the image forming apparatus 20 has been described above.

Figure 5:
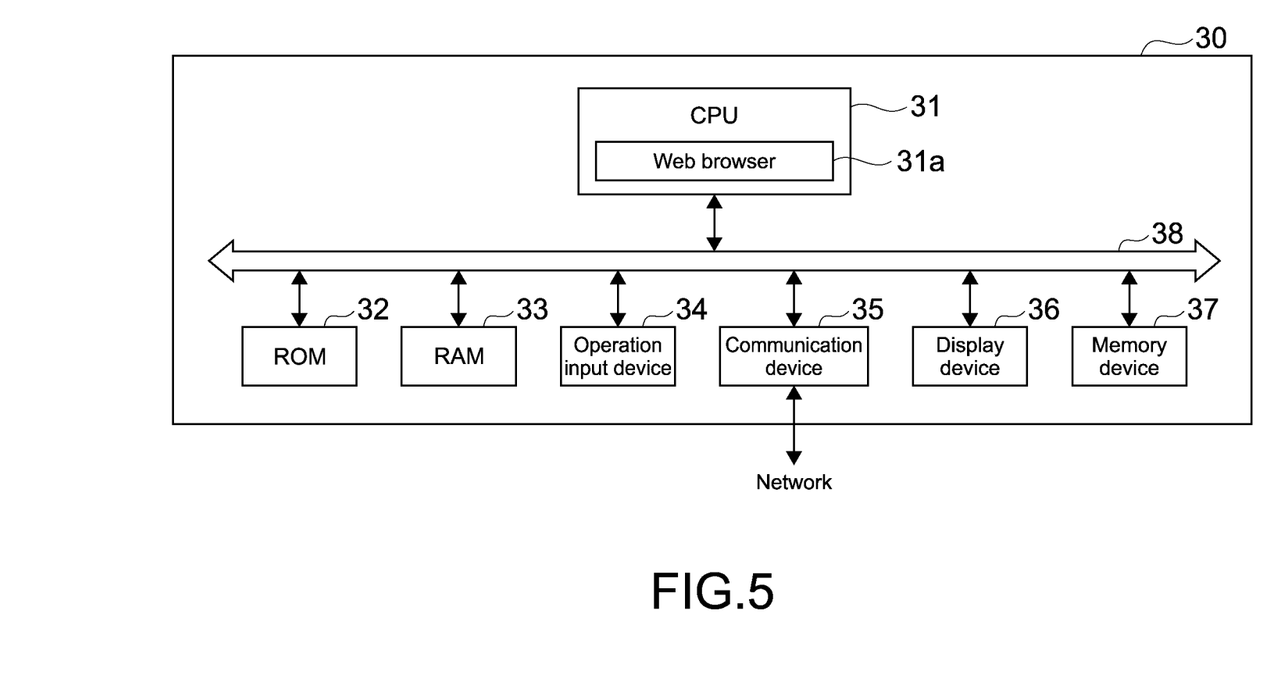
FIG. 5 shows a schematic diagram of a configuration of the PC 30.

Next, a configuration of the PC 30 will be described. The PC 30 may include dedicated hardware and software, or may be a general-purpose computer. FIG. 5 shows a schematic diagram of a configuration of the PC 30.

As shown in FIG. 5, the PC 30 includes the CPU 31, the ROM 32, the RAM 33, the operation input devices 34, the communication device 35 (third communication device), the display device 36, and the memory device 37, which are connected to each other via the bus 38.

The ROM 32 stores a plurality of programs such as firmware and data used to execute various kinds of process. The RAM 33 is used as a work area for the CPU 31, and temporarily stores the OS, various applications being executed, and various data being processed.

The memory device 37 is, for example, an HDD, a flash memory, or another nonvolatile memory. The memory device 37 stores the OS, various applications, and various data.

The communication device 35 is connected to the network in order to send and receive information to and from the image forming apparatus 20 and the management server 10.

In response to a command supplied from the operation input devices 34, the CPU 31 (third processor) loads a corresponding program in the RAM 33 out of a plurality of programs stored in the ROM 32 and the memory device 37 (third memory), and executes the loaded program to appropriately control the display device 36 and the memory device 37.

The operation input devices 34 include, for example, a pointing device such as a mouse, a keyboard, a touch panel, and other operation devices.

The display device 36 is, for example, a liquid crystal display, an EL display, a plasma display, or the like.

The CPU 31 executes a program to thereby realize a functional block, which will be described next.

The CPU 31 of the PC 30 realizes a functional block, i.e., the web browser 31a.

Specifically, the PC 30 includes the communication device 35 (third communication device capable of communicating via the network), the ROM 32 or the memory device 37 (third memory) that stores a web browser program, and the CPU 31 (third processor) that executes the web browser program, when the third processor executes the web browser program, the third processor operating as the web browser 31*a*.

In response to an instruction from a user, the web browser 31*a* sends an HTTP request to the first compressor 11*c*, a destination of the HTTP request being the web server unit 21*b*. The web browser 31*a* presents an HTTP reply received from the first decompressor 11*d* to the user.

The configuration of the PC 30 has been described above.

Figure 6:
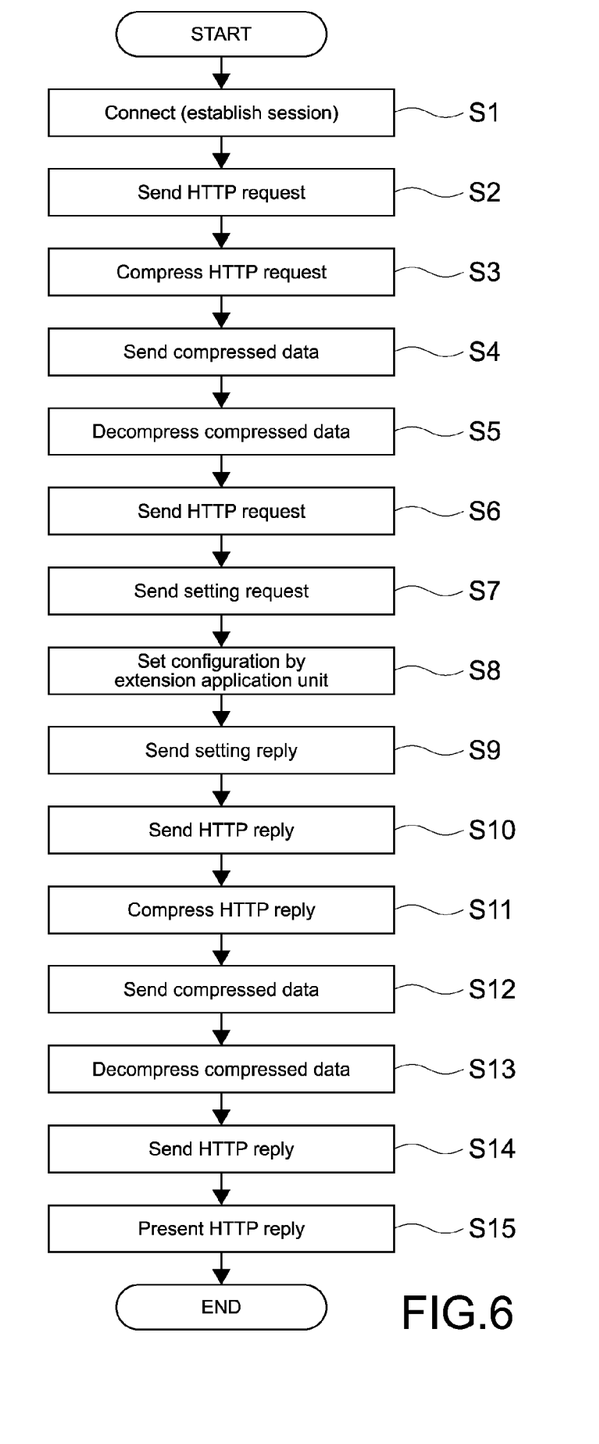
FIG. 6 shows a flow chart of the process of the information processing system 1.

Next, a more detailed flow of the processing of the information processing system 1 will be described. FIG. 6 shows a flow chart of the process of the information processing system 1.

Where no communication path is established between the image forming apparatus 20 and the management server 10, firstly, the second connector 21*d* behind the firewall 100 connects to the first connector 11*b* to establish a session (Step S1).

Next, the web browser 31*a* sends an HTTP request to the first compressor 11*c* on the basis of an instruction from a user, a destination of the HTTP request being the web server unit 21*b* (Step S2).

Next, the first compressor 11*c* compresses the received HTTP request to generate compressed data (Step S3).

Next, the first compressor 11*c* sends the generated compressed data to the second decompressor 21*e* through the established communication path (Step S4).

Next, the second decompressor 21*e* decompresses the received compressed data to reproduce an original HTTP request (Step S5).

Next, the second decompressor 21*e* sends the reproduced HTTP request to the web server unit 21*b* (Step S6).

Next, the web server unit 21*b* converts the received HTTP request into a setting request, and sends the setting request obtained by conversion to the extension application unit 21*c* (Step S7).

Next, the extension application unit 21*c* sets a configuration of the image forming apparatus 20 on the basis of the received setting request (Step S8).

Next, the extension application unit 21*c* replies a result of the setting to the web server unit 21*b* (Step S9).

Next, the web server unit 21*b* converts the received reply of the result of the setting into an HTTP reply, and sends the HTTP reply obtained by conversion to the second compressor 21*f* (Step S10).

Next, the second compressor 21*f* compresses the received HTTP reply to generate compressed data (Step S11).

Next, the second compressor 21*f* sends the generated compressed data to the first decompressor 11*d* (Step S12).

Next, the first decompressor 11*d* decompresses the received compressed data to reproduce an original HTTP reply (Step S13).

Next, the first decompressor 11*d* sends the reproduced HTTP reply to the web browser 31*a* (Step S14).

Next, the web browser 31*a* presents the received HTTP reply to a user (Step S15).

A more detailed processing flow of the information processing system 1 has been described above.

In recent years, a server may be connected to an image forming apparatus (MFP, Multifunction Peripheral) via a network to extend functions of the image forming apparatus.

For example, the following technique is conceivable. An image forming apparatus displays an operation window, which is obtained from a web server outside the image forming apparatus, on a display device.

According to such a technique, process is performed by means of communication via a network. However, it is necessary to execute communication over a firewall via the Internet. When a management server at one site tries to set a configuration of an image forming apparatus at another site protected by the firewall, communicating is blocked under a default configuration, which is a problem.

However, in general, the firewall permits communication from the site that the firewall protects. However, the firewall limits connection from the Internet strictly. Permitted communication over the firewall and refused communication over the firewall are determined on the basis of a security policy of the customer site. In general, the management server is incapable of setting the configuration of the firewall at the customer site in order to communicate with the image forming apparatus since it requires to change the security policy.

In view of the above, according to an embodiment, there is provided an information processing system 1, including: a management server 10 at a management site; a personal computer 30 at the management site, the personal computer 30 being connected to the management server 10 via a network; and an image forming apparatus 20 at a customer site protected by a firewall 100, the image forming apparatus 20 being connectable to the management server 10 via the network over the firewall 100, in which the management server 10 includes a first communication device 28 capable of communicating via the network, a first memory 12, 17 that stores a first relay program, and a first processor 11 that executes the first relay program, when the first processor 11 executes the first relay program, the first processor 11 operating as a first connector 11*b*, a first compressor 11*c*, and a first decompressor 11*d*, the image forming apparatus 20 includes a second communication device 28 capable of communicating via the network, a second memory that stores a second relay program, a web server program, and an extension application program, and a second processor that executes the second relay program, the web server program, and the extension application program, when the second processor executes the second relay program, the second processor operating as a second connector 21*d*, a second decompressor 21*e*, and a second compressor 21*f*, when the second processor executes the web server program, the second processor operating as a web server unit 21*b*, when the second processor executes the extension application program, the second processor operating as an extension application unit 21*c*, and the personal computer 30 includes a third communication device 35 capable of communicating via the network, a third memory 32, 37 that stores a web browser program, and a third processor 31 that executes the web browser program, when the third processor 31 executes the web browser program, the third processor 31 operating as a web browser 31*a*, in which where no communication path is established between the image forming apparatus 20 and the management server 10, the second connector 21*d* of the image forming apparatus 20 behind the firewall 100 connects to the first connector 11*b* of the management server 10 to establish a session, the web browser 31*a* of the personal computer 30 sends an HTTP request to the first compressor 11*c* on the basis of an instruction from a user, a destination of the HTTP request being the web server unit 21*b* of the image forming apparatus 20, the first compressor 11*c* of the management server 10 compresses the HTTP request received from the web browser 31*a* to generate first compressed data, and sends the generated first compressed data to the second decompressor 21*e* of the image forming apparatus 20 through a communication path established between the first connector 11b and the second connector 21d, the second decompressor 21e of the image forming apparatus 20 decompresses the first compressed data received from the first compressor 11c to reproduce the original HTTP request, and sends the HTTP request to the web server unit 21b, the web server unit 21b of the image forming apparatus 20 receives the HTTP request sent from the first compressor 11c, converts the HTTP request into a setting request, and sends the setting request to the extension application unit 21c, the extension application unit 21c of the image forming apparatus 20 receives the setting request from the web server unit 21b, sets a configuration of the image forming apparatus 20 on the basis of the received setting request, and replies a result of the setting to the web server unit 21b, the web server unit 21b of the image forming apparatus 20 converts the reply of the result of the setting received from the extension application unit 21c into an HTTP reply, and sends the HTTP reply to the second compressor 21f, the second compressor 21f of the image forming apparatus 20 compresses the HTTP reply received from the web server unit 21b to generate second compressed data, and sends the generated second compressed data to the first decompressor 11d of the management server 10, the first decompressor 11d of the management server 10 decompresses the second compressed data received from the second compressor 21f, reproduces an original HTTP reply, and sends the HTTP reply to the web browser 31a, and the web browser 31a of the personal computer 30 presents the HTTP reply received from the first decompressor 11d to the user.

Therefore it is possible to set a configuration of the image forming apparatus 20 at a customer site from the external management server 10 without changing the configuration setting of the firewall 100.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing system, comprising:
a management server at a management site;
a personal computer at the management site, the personal computer being connected to the management server via a network; and
an image forming apparatus at a customer site protected by a firewall, the image forming apparatus being connected to the management server via the network over the firewall, wherein the management server includes
a first communication device communicating via the network,
a first memory that stores a first relay program, and
a first processor that executes the first relay program,
when the first processor executes the first relay program, the first processor operating as a first connector, a first compressor, and a first decompressor, the image forming apparatus includes
a second communication device communicating via the network,
a second memory that stores a second relay program, a web server program, and an extension application program, and
a second processor that executes the second relay program, the web server program, and the extension application program,
when the second processor executes the second relay program, the second processor operating as a second connector, a second decompressor, and a second compressor,
when the second processor executes the web server program, the second processor operating as a web server unit,
when the second processor executes the extension application program, the second processor operating as an extension application unit, and
the personal computer includes
a third communication device communicating via the network,
a third memory that stores a web browser program, and
a third processor that executes the web browser program,
when the third processor executes the web browser program, the third processor operating as a web browser, and wherein
where no communication path is established between the image forming apparatus and the management server, the second connector of the image forming apparatus at the customer site protected by the firewall connects to the first connector of the management server over the firewall to establish a session,
the web browser of the personal computer sends an HTTP request to the first compressor on the basis of an instruction from a user, a destination of the HTTP request being the web server unit of the image forming apparatus,
the first compressor of the management server compresses the HTTP request received from the web browser to generate first compressed data, and sends the generated first compressed data to the second decompressor of the image forming apparatus through a communication path established between the first connector and the second connector,
the second decompressor of the image forming apparatus decompresses the first compressed data received from the first compressor to reproduce an original HTTP request, and sends the HTTP request to the web server unit,
the web server unit of the image forming apparatus receives the HTTP request sent from the first compressor, converts the HTTP request into a setting request, and sends the setting request to the extension application unit,
the extension application unit of the image forming apparatus receives the setting request from the web server unit, sets a configuration of the image forming apparatus on the basis of the received setting request, and replies a result of the setting to the web server unit,
the web server unit of the image forming apparatus converts the reply of the result of the setting received from the extension application unit into an HTTP reply, and sends the HTTP reply to the second compressor,
the second compressor of the image forming apparatus compresses the HTTP reply received from the web server unit to generate second compressed data, and sends the generated second compressed data to the first decompressor of the management server,
the first decompressor of the management server decompresses the second compressed data received from the second compressor, reproduces an original HTTP reply, and sends the HTTP reply to the web browser, and
the web browser of the personal computer presents the HTTP reply received from the first decompressor to the user.

2. The information processing system according to claim 1, wherein
permitted communication over the firewall and refused communication over the firewall are determined on the basis of a security policy of the customer site, and
the management server is incapable of changing the security policy.

3. An information processing method of an information processing system including a management server at a management site, a personal computer at the management site, the personal computer being connected to the management server via a network, and an image forming apparatus at a customer site protected by a firewall, the image forming apparatus being connected to the management server via the network over the firewall, the information processing method comprising:
where no communication path is established between the image forming apparatus and the management server, by a second connector of the image forming apparatus at the customer site protected by the firewall, connecting a first connector of the management server over the firewall to establish a session;
by a web browser of the personal computer, sending an HTTP request to a first compressor on the basis of an instruction from a user, a destination of the HTTP request being a web server unit of the image forming apparatus;
by the first compressor of the management server, compressing the HTTP request received from the web browser to generate first compressed data, and sending the generated first compressed data to a second decompressor of the image forming apparatus through a communication path established between the first connector and the second connector;
by the second decompressor of the image forming apparatus, decompressing the first compressed data received from the first compressor to reproduce an original HTTP request, and sending the HTTP request to the web server unit;
by the web server unit of the image forming apparatus, receiving the HTTP request sent from the first compressor, converting the HTTP request into a setting request, and sending the setting request to an extension application unit;
by the extension application unit of the image forming apparatus, receiving the setting request from the web server unit, setting a configuration of the image forming apparatus on the basis of the received setting request, and replying a result of the setting to the web server unit;
by the web server unit of the image forming apparatus, converting the reply of the result of the setting received from the extension application unit into an HTTP reply, and sending the HTTP reply to a second compressor;
by the second compressor of the image forming apparatus, compressing the HTTP reply received from the web server unit to generate second compressed data, and sending the generated second compressed data to a first decompressor of the management server;
by the first decompressor of the management server, decompressing the second compressed data received from the second compressor, reproducing an original HTTP reply, and sending the HTTP reply to the web browser; and
by the web browser of the personal computer, presenting the HTTP reply received from the first decompressor to the user.

* * * * *